Figure 1:
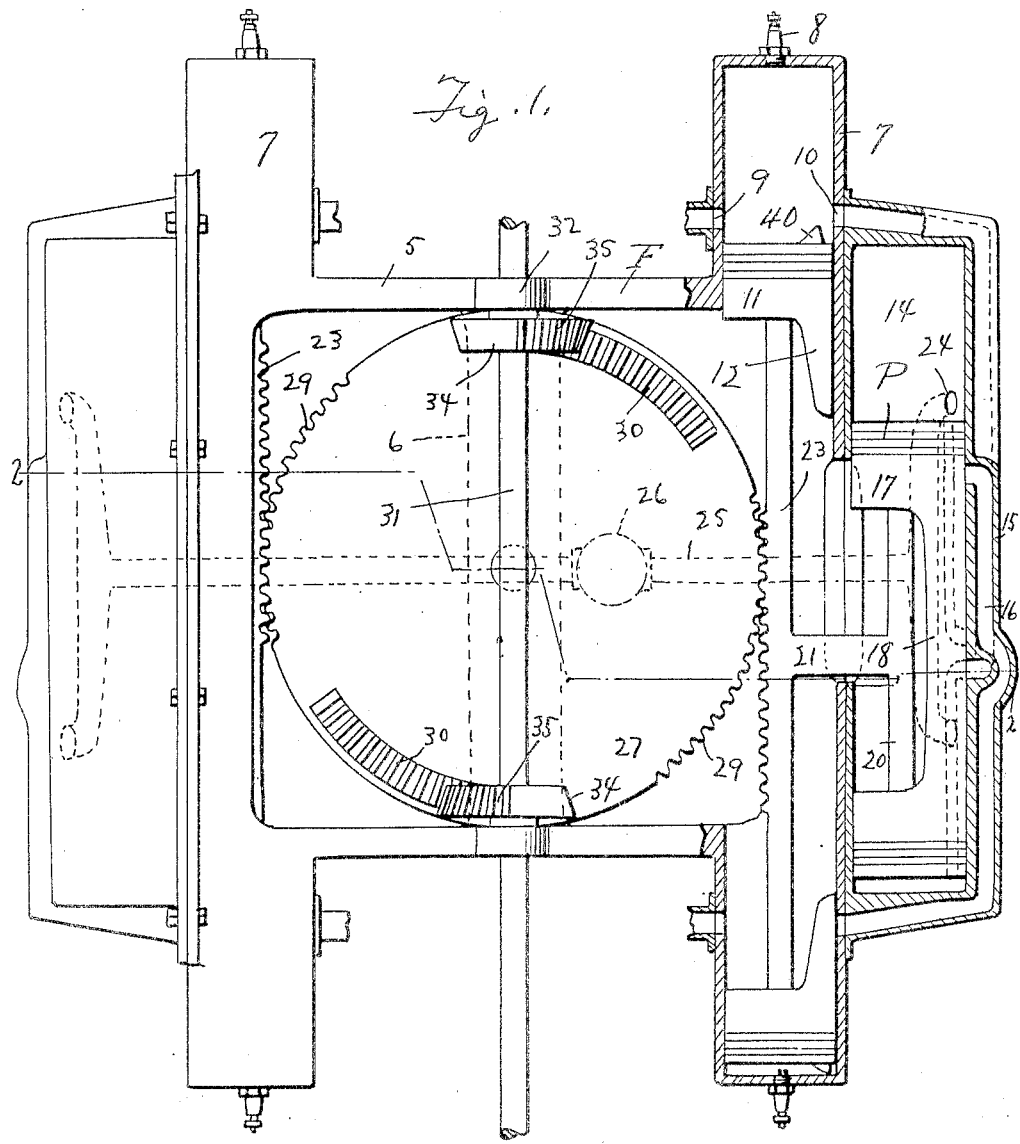

Nov. 5, 1929.                P. JEREB                 1,734,489
                      INTERNAL COMBUSTION ENGINE
                       Filed Nov. 26, 1928        2 Sheets-Sheet 2

Inventor
Paul Jereb

By Clarence A. O'Brien
                    Attorney

Patented Nov. 5, 1929

1,734,489

UNITED STATES PATENT OFFICE

PAUL JEREB, OF EKALAKA, MONTANA

INTERNAL-COMBUSTION ENGINE

Application filed November 26, 1928. Serial No. 321,956.

The present invention relates to an internal combustion engine and has for its prime object to provide a structure which will eliminate the use of cranks as is the common practice.

Another very important object of the invention resides in the provision of an internal combustion engine of this nature utilizing the two-cycle principle and having means for compressing the gases prior to their entrance in the cylinder.

A still further very important object of the invention resides in the provision of an internal combustion engine of this nature embodying a plurality of cylinders compactly and conveniently arranged so as to provide a comparatively simple construction which is thoroughly efficient and reliable in operation.

With the above and numerous other objects in view as will appear as the description proceeds, the invention resides in certain novel features of construction, and in the combination and arrangement of parts as will be hereinafter more fully described and claimed.

Figure 2:
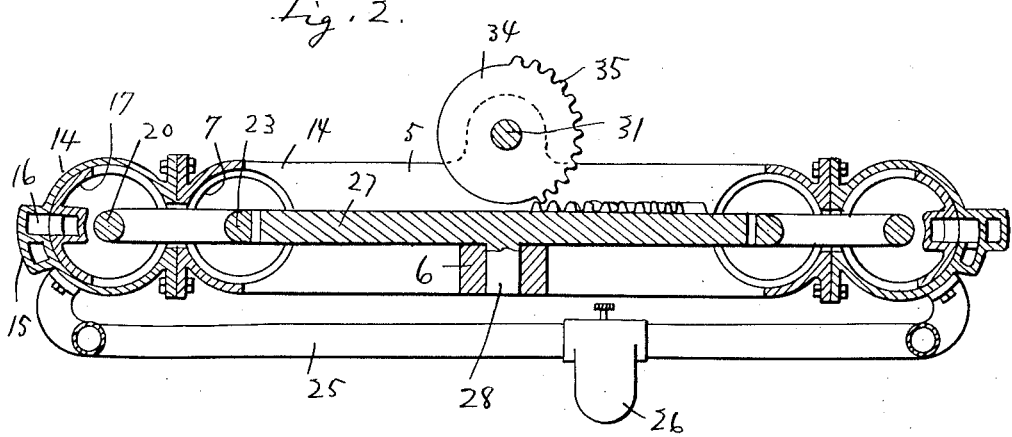
Figure 3:
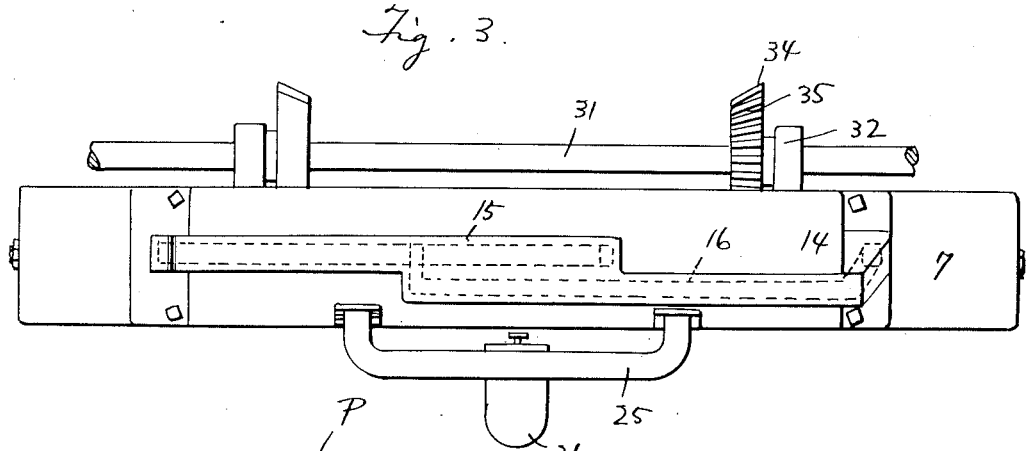
Figure 4:
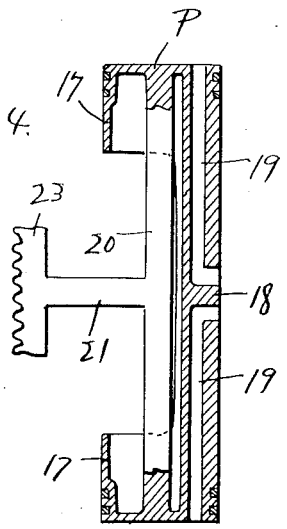

In the drawing:

Figure 1 is a plan view of the engine embodying the features of my invention showing portions in section, Figure 2 is a transverse section taken substantially on the line 2—2 of Figure 1, Figure 3 is a side elevation thereof, and Figure 4 is a sectional view through one of the compression piston units.

Referring to the drawing in detail it will be seen that the letter F denotes a frame including end transverse members 5 and a center longitudinal member 6. Cylinders 7 project outwardly from the ends of the members 5 longitudinally of the frame and have their outer ends closed with spark plugs 8 therein. Each cylinder 7 is formed with an exhaust port 9 and an intake port 10 oppositely disposed adjacent the end thereof. Pistons 11 are slidable in the cylinder 7 and their skirts are provided with extensions 12 for maintaining the intake ports 10 closed during the movement of the piston in the major portions of the cylinders 7.

Compression cylinders 14 are mounted on the sides of the frame longitudinally thereof one adjacent each cylinder 7 inwardly thereof and are connected in pairs by walls 15. These walls 15 have passages 16 leading therethrough and through the walls of the cylinders 14 and over the ends thereof to communicate with intake ports 10. The passages 16 terminate past the center of the walls 15 adjacent the inner end of the opposed cylinders 14. Piston units P each comprise a pair of pistons 17 operable in opposed cylinders 14 and connected by members 18 having passages 19 therein leading through the pistons 17 and terminating short of the center of the members 18. The pistons 17 are connected by bar 20 having a lateral extension 21 connected to the center of rack bar 23 which connects oppositely disposed pistons 11. The cylinders 14 are provided with intake ports 24 adjacent their inner ends which are connected with branches of a manifold 25 leading from a carbureter 26.

A disk 27 is journaled on the longitudinal member 6 as at 28 and has oppositely disposed peripheral gear segments 29 and oppositely disposed spaced gear segments 30. A shaft 31 is journaled in bearings 32 on the end members 5 and has wheels 34 fixed thereto formed with opposite disposed gear segments 35 meshable with gear segments 30. The segments 29 mesh with the rack bars 23 so that the reciprocation of these rack bars oscillate the disk 27 to cause continuous rotation in the shaft 31 by the alternate meshing of segments 30 with segments 35 of the two wheels 34.

Considering the cylinder 7 in the upper right hand corner of Figure 1 for the purpose of explaining the operation of the engine it will be seen that gas is being forced into the cylinder which will exhaust the burnt gases therein, a baffle 40 being provided on the respective piston 11 to prevent the mixtures of these two gases. As the piston 11 moves up in the cylinder 7 the ports 10 will be closed and maintained closed by the extension 12. As the piston arrives at the outer end of the cylinder 7 explosion will take place driving the piston downwardly to a position shown in Figure 1. During the movement of the piston 11 thus described it will be seen that piston unit P moves likewise so that the piston 17 in the upper right hand cylinder 14 moves inwardly thereof, closing the port therein and compressing the gas therein and forcing it through adjacent passage 17 when the inner end thereof registers with the passage 16 shown in section in Figure 1 so that the gas will be forced into the lower right hand cylinder 7.

From the above detailed description of the cycles of various features it is thought that a complete understanding of the invention may be had without further description. It is to be understood, however, that the present embodiment of the invention has been disclosed in detail merely by way of example since in actual practice it attains the features of invention enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In an internal combustion engine, a frame comprising transverse members, a longitudinal member connecting the centers of the end members, explosive cylinders on the frame, one at each end of each end member, said cylinders projecting outwardly from and longitudinally of the frame, a piston in each cylinder, a pair of rack bars connecting the oppositely disposed pistons in pairs, compression cylinders on the sides of the frame one adjacent each explosive cylinder, pistons in the compression cylinders, means connecting the second mentioned pistons with the rack bars, a disk rotatable on the longitudinal member and having peripheral teeth meshing with the rack bars, a disk rotatable on the longitudinal member and having peripheral teeth meshing with the rack bars and oppositely disposed arcuate gear segments on one surface, a shaft journaled across the end members, wheels on the shaft and having oppositely disposed gear teeth meshable with the gear segment, each pair of compression cylinders having a connecting wall formed with passages leading from the inner ends of the compression cylinders to points past the center of the wall, each pair of pistons in the compression cylinders having a connecting member formed with passages leading inwardly from the pistons to terminate short of the center of the connecting member.

2. In an internal combustion engine, a frame comprising transverse members, a longitudinal member connecting the centers of the end members, explosive cylinders on the frame, one at each end of each end member, said cylinders projecting outwardly from the longitudinally of the frame, a piston in each cylinder, a pair of rack bars connecting the oppositely disposed pistons in pairs, compression cylinders on the sides of the frame one adjacent each explosive cylinder, pistons in the compression cylinders, means connecting the second mentioned pistons with the rack bars, a disk rotatable on the longitudinal member and having peripheral teeth meshing with the rack bars, a disk rotatable on the longitudinal member and having peripheral teeth meshing with the rack bars and oppositely disposed arcuate gear segments on one surface, a shaft journaled across the end members, wheels on the shaft and having oppositely disposed gear teeth meshable with the gear segment, each pair of compression cylinders having a connecting wall formed with passages leading from the inner ends of the compression cylinders to points past the center of the wall each pair of pistons in the compression cylinders having a connecting member formed with the passages leading inwardly from the pistons to terminate short of the center of the connecting member, and an intake manifold connected with the compression cylinders at their inner ends and an exhaust manifold connected with the explosion cylinders adjacent their inner ends.

3. An internal combustion engine of the class described comprising a frame, a plurality of explosive cylinders on the frame, one at each corner thereof extending outwardly therefrom and longitudinally thereof, a piston in each cylinder, a pair of rack bars connecting the oppositely disposed pistons in pairs, compression cylinders on the sides of the frame one adjacent each explosive cylinder and inwardly thereof, pistons in the compression cylinders, means connecting the second mentioned piston with the rack bar, a disk rotatable on the frame and having peripheral teeth meshing with the rack bars and oppositely disposed arcuate series of gear teeth forming segments on its surface, a shaft journaled across the frame longitudinally thereof, wheels on the shaft and having oppositely disposed gear teeth meshable with the gear segment, each pair of compression cylinders having a connecting wall formed with passages leading from the inner ends of the compression cylinder to points past the center of the wall, each pair of compression cylinders having a connecting wall formed with passages leading from the inner ends of the compression cylinders to points past the center of the wall, each pair of pistons of the compression cylinders having a connecting member formed with passages leading inwardly from the pistons to terminate short of the center of the connecting member.

4. An internal combustion engine of the class described comprising a frame, a plurality of explosive cylinders on the frame, one at each corner thereof extending outwardly therefrom and longitudinally thereof, a piston in each cylinder, a pair of rack bars connecting the oppositely disposed pistons in pairs, compression cylinders on the sides of the frame one adjacent each explosive cylinder and inwardly thereof, pistons in the compression cylinders, means connecting the second mentioned piston with the rack bar, a disk rotatable on the frame and having peripheral teeth meshing with the rack bars and oppositely disposed arcuate series of gear teeth forming segments on its surface, a shaft journaled across the frame longitudinally thereof, wheels on the shaft and having oppositely disposed gear teeth meshable with the gear segment, each pair of compression cylinders having a connecting wall formed with passages leading from the inner ends of the compression cylinders to points past the center of the wall, each pair of compression cylinders having a connecting wall formed with passages leading from the inner ends of the compression cylinders to point past the center of the wall, each pair of pistons of the compression cylinders having a connecting member formed with passages leading inwardly from the pistons to terminate short of the center of the connecting member, an intake manifold connected with the compression cylinders adjacent their inner ends, and an exhaust manifold connected with the explosion cylinders adjacent their inner ends.

5. In an internal combustion engine, a frame, a plurality of explosive cylinders on the frame one at each corner thereof, said cylinders projecting outwardly from and longitudinally of the frame, a piston in each cylinder, compression cylinders on the sides of the frame one adjacent each explosion cylinder, pistons in the compression cylinders, means connecting the second mentioned pistons with the rack bars, a shaft journaled across the frame, means for translating the rectilinear motion of the rack bars into rotary motion of the shaft, each pair of compression cylinders having a connecting wall formed with passages leading from the inner ends of the compression cylinders to points past the center of the walls, each pair of pistons in the compression cylinders having a connecting member formed with passages leading inwardly from the pistons thereof to terminate short of the center thereof.

In testimony whereof I affix my signature.

PAUL JEREB.